(12) United States Patent
Herbach et al.

(10) Patent No.: US 11,243,535 B2
(45) Date of Patent: *Feb. 8, 2022

(54) SUGGESTING ALTERNATIVE PICKUP AND DROP OFF LOCATIONS FOR AUTONOMOUS VEHICLES

(71) Applicant: Waymo LLC, Mountain View, CA (US)

(72) Inventors: Joshua Seth Herbach, San Francisco, CA (US); Michael Epstein, Danville, CA (US); Mishika Vora, Hayward, CA (US); Guillaume Dupre, San Francisco, CA (US); Kevin Rawlings, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/696,155

(22) Filed: Nov. 26, 2019

(65) Prior Publication Data

US 2020/0166935 A1    May 28, 2020

Related U.S. Application Data

(63) Continuation of application No. 15/843,090, filed on Dec. 15, 2017, now Pat. No. 10,520,941.

(51) Int. Cl.
*G05D 1/00*    (2006.01)
*G06Q 10/02*    (2012.01)
(Continued)

(52) U.S. Cl.
CPC ......... *G05D 1/0088* (2013.01); *G05D 1/0274* (2013.01); *G06Q 10/02* (2013.01);
(Continued)

(58) Field of Classification Search
CPC .......................... G05D 1/0088; G05D 1/0274
See application file for complete search history.

(56) References Cited

U.S. PATENT DOCUMENTS 8,935,034 B1    1/2015  Zhu et al.
9,429,943 B2    8/2016  Wilson et al.
(Continued)

FOREIGN PATENT DOCUMENTS

JP    2012202885 A    10/2012
JP    2014115147 A    6/2014

OTHER PUBLICATIONS

ISR and Written Opinion for application No. PCT/US2018/061790 dated Mar. 20, 2019.
(Continued)

*Primary Examiner* — Thomas Ingram
(74) *Attorney, Agent, or Firm* — Botos Churchill IP Law

(57) ABSTRACT

Aspects of the disclosure relate to controlling a vehicle in an autonomous driving mode. For instance, a first location corresponding to a location where the vehicle is to pick up or drop off a passenger is received. A first cost for the vehicle to reach the first location is determined. A second location based on the first location is identified, and a second cost is determined based on a cost for the vehicle to reach the second location and a cost for the passenger to reach the second location. The first cost is compared to the second cost, and a notification is sent based on the notification. In response to sending the notification, instructions to proceed to the second location are received, and in response to receiving the instructions, the vehicle is controlled in the autonomous driving mode to the second location to pick up or drop off the passenger.

25 Claims, 12 Drawing Sheets

(51) Int. Cl.
  *G06Q 10/04* (2012.01)
  *G06Q 50/30* (2012.01)
  *G06Q 30/06* (2012.01)
  *G05D 1/02* (2020.01)

(52) U.S. Cl.
  CPC ........... *G06Q 10/047* (2013.01); *G06Q 30/06* (2013.01); *G06Q 50/30* (2013.01)

(56) References Cited

U.S. PATENT DOCUMENTS

| | | |
|---|---|---|
| 9,613,386 B1* | 4/2017 | Arden .................... G08G 1/205 |
| 9,769,616 B1 | 9/2017 | Pao et al. |
| 2011/0099040 A1 | 4/2011 | Felt et al. |
| 2015/0206437 A1* | 7/2015 | Fowler ................... G01C 21/34 701/410 |
| 2015/0377635 A1* | 12/2015 | Beaurepaire ....... G01C 21/3423 701/408 |
| 2016/0334797 A1* | 11/2016 | Ross ...................... G06Q 10/08 |
| 2016/0370194 A1* | 12/2016 | Colijn ................ G01C 21/3438 |
| 2017/0123421 A1* | 5/2017 | Kentley ................. G08G 1/202 |
| 2017/0148316 A1* | 5/2017 | Curlander ............ G01C 21/362 |
| 2017/0344010 A1 | 11/2017 | Rander et al. |

OTHER PUBLICATIONS

Notice of Reasons for Rejection for Japanese Patent Application No. 2020-528312, dated Aug. 24, 2021.
The Search Report and Written Opinion for Singapore Patent Application No. 11202004827P, dated Jul. 6, 2021.

* cited by examiner

SUGGESTING ALTERNATIVE PICKUP AND DROP OFF LOCATIONS FOR AUTONOMOUS VEHICLES

CROSS REFERENCE TO PRIOR APPLICATION

The present application is a continuation of U.S. application Ser. No. 15/843,090, filed Dec. 15, 2017, the disclosure of which is hereby incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In many cases, the human driver and the user are able to arrange an exact location for the user to be picked up. In addition, drivers and users are able to "flag down" one another, use eye contact, speak to one another, or other signals to indicate recognition of one another and thereby agree to some location prior to the vehicle reaching the exact location for the pickup or drop off. This is not readily achievable in the case of autonomous vehicles which do not have a human driver.

BRIEF SUMMARY

One aspect of the disclosure provides a method of controlling a vehicle in an autonomous driving mode. The method includes receiving, by one or more processors, a first location corresponding to a location where the vehicle is to pick up or drop off a passenger; determining, by the one or more processors, a first cost for the vehicle to reach the first location; identifying a second location based on the first location; determining, by the one or more processors, a second cost based on a cost for the vehicle to reach the second location and a cost for the passenger to reach the second location; comparing the first cost to the second cost; sending a notification based on the comparison; in response to sending the notification, receiving, by the one or more processors, instructions to proceed to the second location; and in response to receiving the instructions, controlling, by the one or more processors, the vehicle in the autonomous driving mode to the second location to pick up or drop off the passenger.

In one example, the first location corresponds to a first side of a street, further comprising, identifying the second location includes selecting the second location on a second side of the street opposite of the first side of the street. In this example, determining the cost for the passenger to reach the second side includes determining the cost for the passenger to reach the second side. In addition, determining the cost of the passenger to reach the second side includes assessing an amount of difficulty for the passenger to cross the street. Further, assessing the amount of difficulty is based on whether there is a median on the street. In addition or alternatively, assessing the amount of difficulty is based on a number of lanes to be crossed. In addition or alternatively, assessing the amount of difficulty is based on an availability of crosswalks for the passenger to use to cross the street. In addition or alternatively, assessing the amount of difficulty is based on a speed limit for the street. In addition or alternatively, determining the cost of the passenger to reach the second side includes determining the distance the passenger needs to travel to the second location after crossing the street.

In another example, determining the second cost includes adding the cost for the vehicle to reach the second location and the cost for the passenger to reach the second location. In another example, the comparing includes determining a difference between the first cost and the second cost and comparing this difference to a first threshold value. In this example, the notification is sent only when the difference meets the first threshold value. In addition, as the vehicle is being controlled towards the second location, determining a third cost for the vehicle to reach the second location using a current location of the vehicle; determining a fourth cost based on a cost for the vehicle to reach a third location using the current location of the vehicle and a cost for the passenger to reach the third location from the second location; comparing the third cost to the fourth cost; sending a second notification based on the comparison of the third cost to the fourth cost; receiving instructions to proceed to the third location; and controlling the vehicle in the autonomous driving mode to the third location to pick up or drop off the passenger. In this example, determining the cost for the passenger to reach the third location includes determining the cost for the passenger to reach the first side. In addition or alternatively, the comparing includes determining a difference between the first cost and the second cost and comparing this difference to a second threshold value, and wherein the second threshold value is greater than the first threshold value. Further, the second notification is sent only when the difference meets the second threshold value.

Another aspect of the disclosure provides a system for of controlling a vehicle in an autonomous driving mode. The system includes one or more processors configured to receive a first location corresponding to a location where the vehicle is to pick up or drop off a passenger; determine a first cost for the vehicle to reach the first location; identify a second location based on the first location; determine a second cost based on a cost for the vehicle to reach the second location and a cost for the passenger to reach the second location; compare the first cost to the second cost; send a notification based on the comparison; in response to sending the notification, receive instructions to proceed to the second location; and in response to receiving the instructions, control the vehicle in the autonomous driving mode to the second location to pick up or drop off the passenger.

In one example, the first location corresponds to a first side of a street, further comprising, identifying the second location includes selecting the second location on a second side of the street opposite of the first side of the street. In another example, determining the cost for the passenger to reach the second side includes determining the cost for the passenger to reach the second side by assessing an amount of difficulty for the passenger to cross the street. In another example, the system also includes the vehicle.

DETAILED DESCRIPTION

Overview

Figure 1:
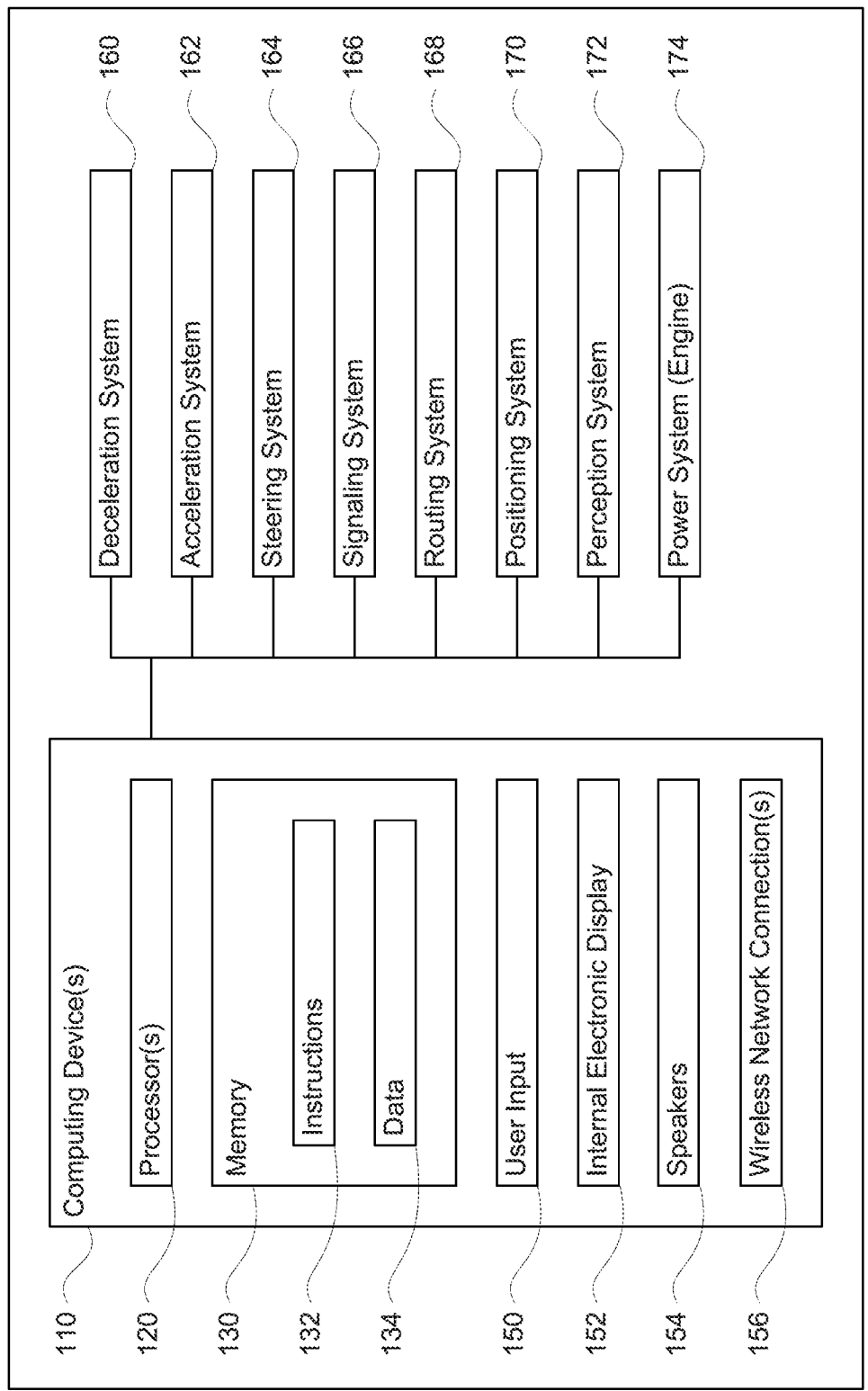
FIG. 1 is a functional diagram of an example vehicle in accordance with an exemplary embodiment.

The technology relates to determining which side of a street to conduct a pickup or drop off of a passenger for autonomous vehicles. For instance, a vehicle's computing devices may determine how to reach a location from the vehicle's current location by calculating the costs of different routes and selecting a route to the location having the lowest cost. This method may be used to determine which side of a street to pick up or drop off a passenger, and to provide a passenger with notifications indicating that the passenger can change the side of the street on which the passenger will be pick up.

Initially, the vehicle's computing devices may receive a location for picking up or dropping off a passenger. The location may be associated with a first side of a street. When routing to this location, the computing devices may compute costs for routing to the location, selecting a route having the lowest cost.

In addition, the computing devices may identify a second location corresponding to a second side of the street. For instance, the computing devices may draw a perpendicular line across the street, and identify a closest pickup spot to a location where the line intersects with the second side of the street.

The computing devices may determine or compute costs for routing to this second side of the street as discussed above. The computing devices may also compute a cost to a passenger for crossing from the first side to the second side. This cost may be combined or added to the cost of routing to the second side of the street.

This combined value may be compared to the cost of routing to the location on the first side of the street. If the combined value is less than the cost of routing to the first side or at least a first threshold less, the passenger may be asked if he or she wants to be picked up or dropped off on the second side of the street at the second location. In other words, the comparison may be used to determine whether to send a notification to a passenger's client computing device identifying the second location as a possible pickup or drop off location.

Such notifications may be sent to the passenger's client computing device, either directly from the vehicle's computing devices or indirectly via a dispatching server computing device, asking the passenger if he or she would like to cross the street and be picked up at the second location. If the passenger confirms, a signal may be sent to the computing devices from the client device (either directly or indirectly). This signal may include instructions for the vehicle to proceed to the second location. In response to receiving such instructions at the vehicle, the vehicle may be routed to the second location in order to pick up or drop off the passenger.

These computations and comparison may be repeated periodically to determine if there is a cost savings for the passenger crossing the street. For instance, this calculation may be performed once per second using the vehicle's current location to compute the costs of reaching both sides of the street as well as the cost of crossing from the side of the pickup location to the opposite side of the street. Of course, before sending a second notification asking the passenger to cross the street, the cost savings must be at least a second threshold significantly greater than the first threshold.

The features described herein may provide for more efficient vehicle routing. These features may also provide a passenger with more convenient and real time options to ensure reduced wait and driving times when practical. In addition to the benefits to the passenger, the vehicle may be able to follow a simpler and/or easier route, as the vehicle may be able to avoid complicated or unwanted maneuvers such as U-turns, k-turns, unprotected left turns, etc.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2A:
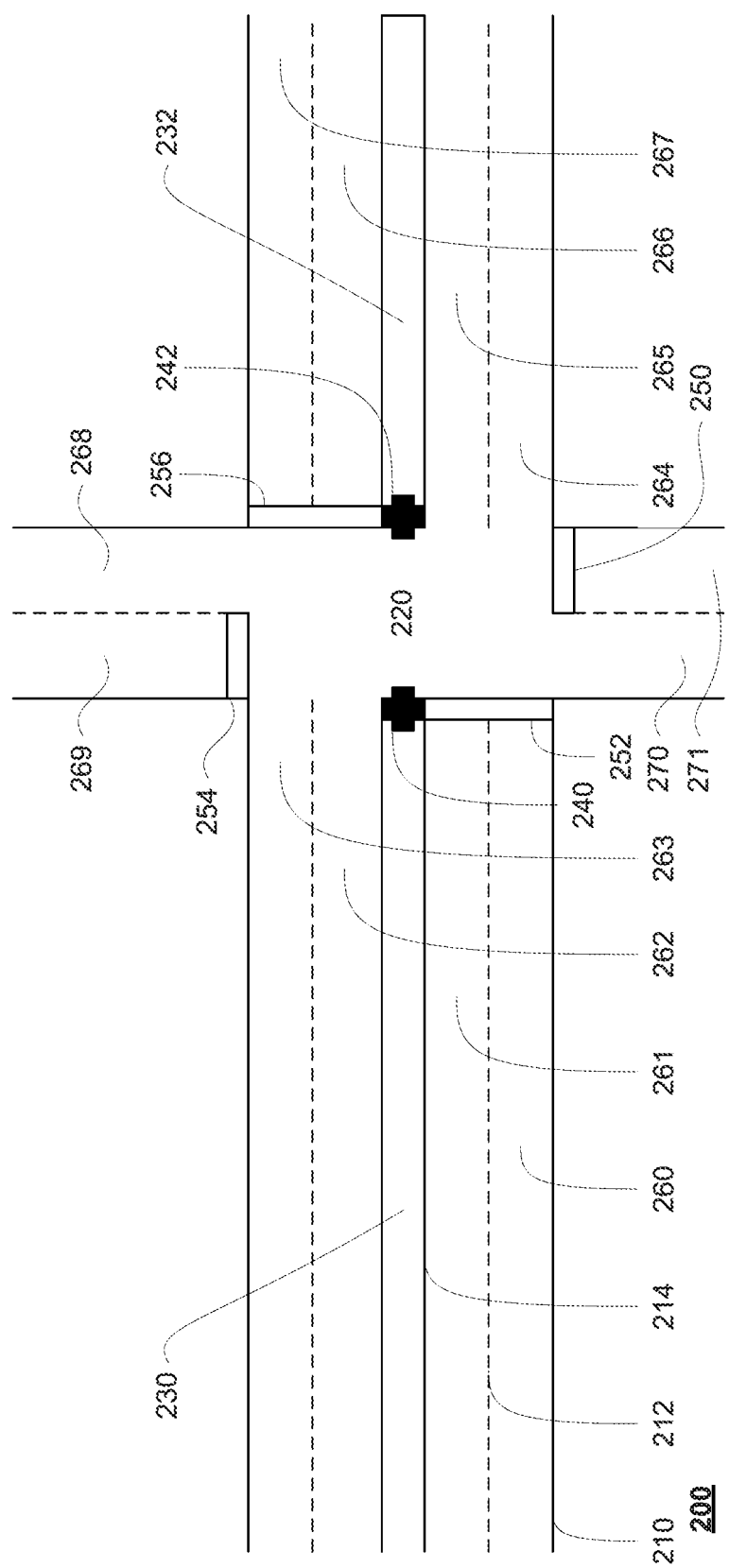
FIGS. 2A and 2B is an example of map information in accordance with aspects of the disclosure.
Figure 2B:
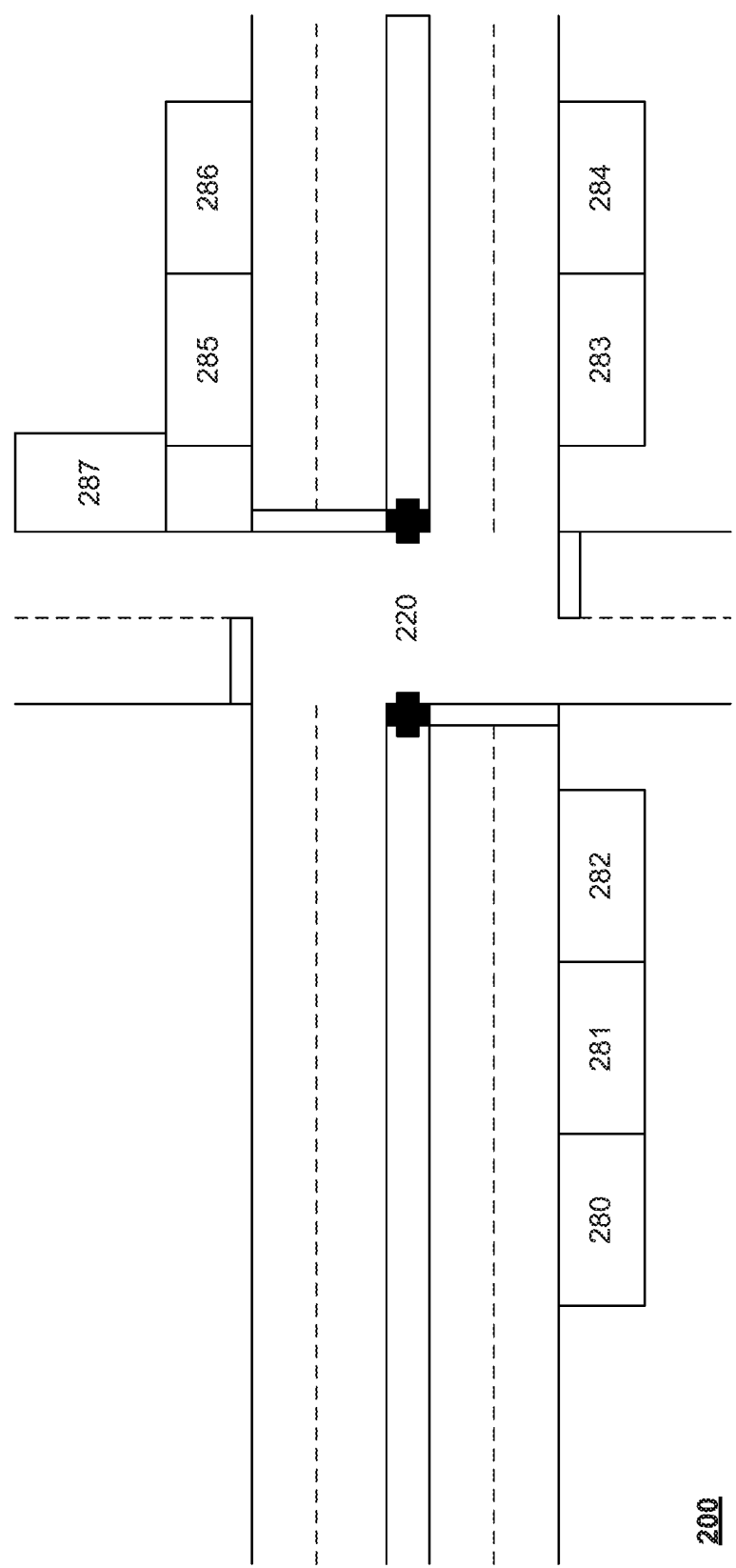

FIGS. 2A and 2B are an example of map information 200 for a section of roadway including intersection 220. FIG. 2A depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information 200 may identify parking areas which may include areas where a vehicle is able to stop and way to pick up a drop off passengers. These areas may correspond to parking spaces, waiting areas, shoulders, parking lots, etc. For instance, FIG. 2B depicts parking areas 280-287. For simplicity, these parking areas may correspond to parking spaces, but may correspond to any type of area in which a vehicle is able to stop and way to pick up a drop off passengers.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position.

Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
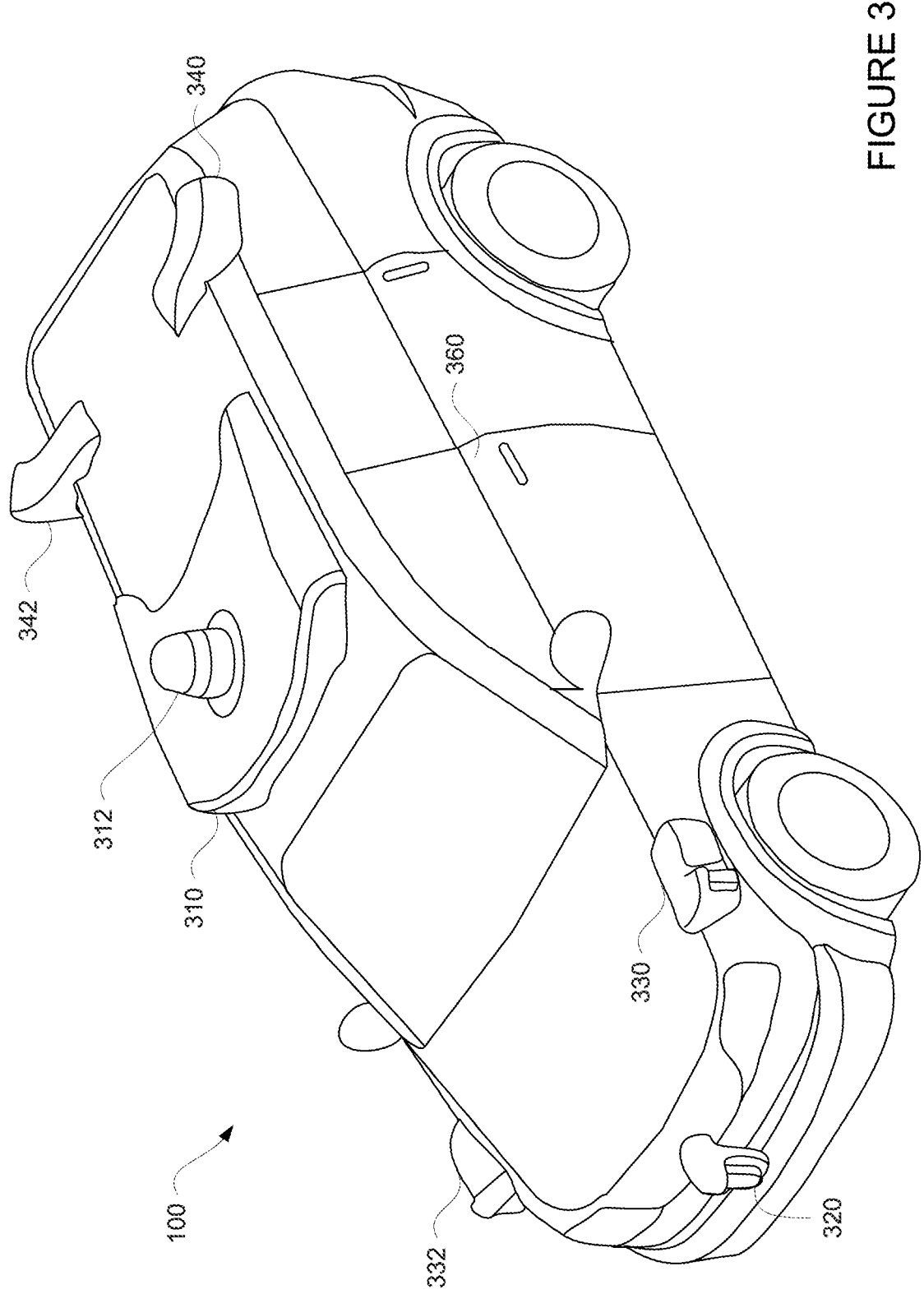
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, rooftop housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or rooftop housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
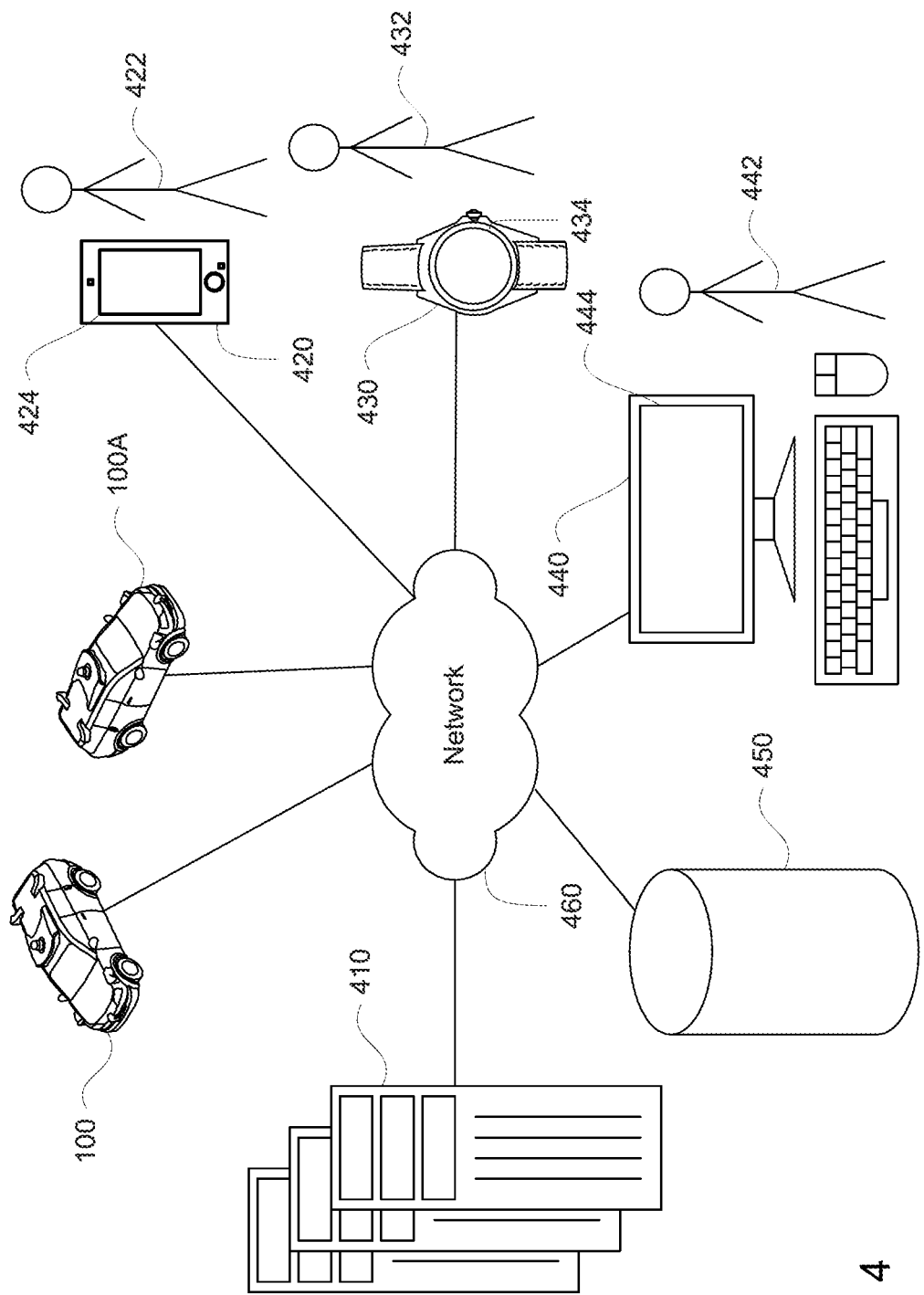
FIG. 4 is a pictorial diagram of an example system in accordance with an exemplary embodiment.
Figure 5:
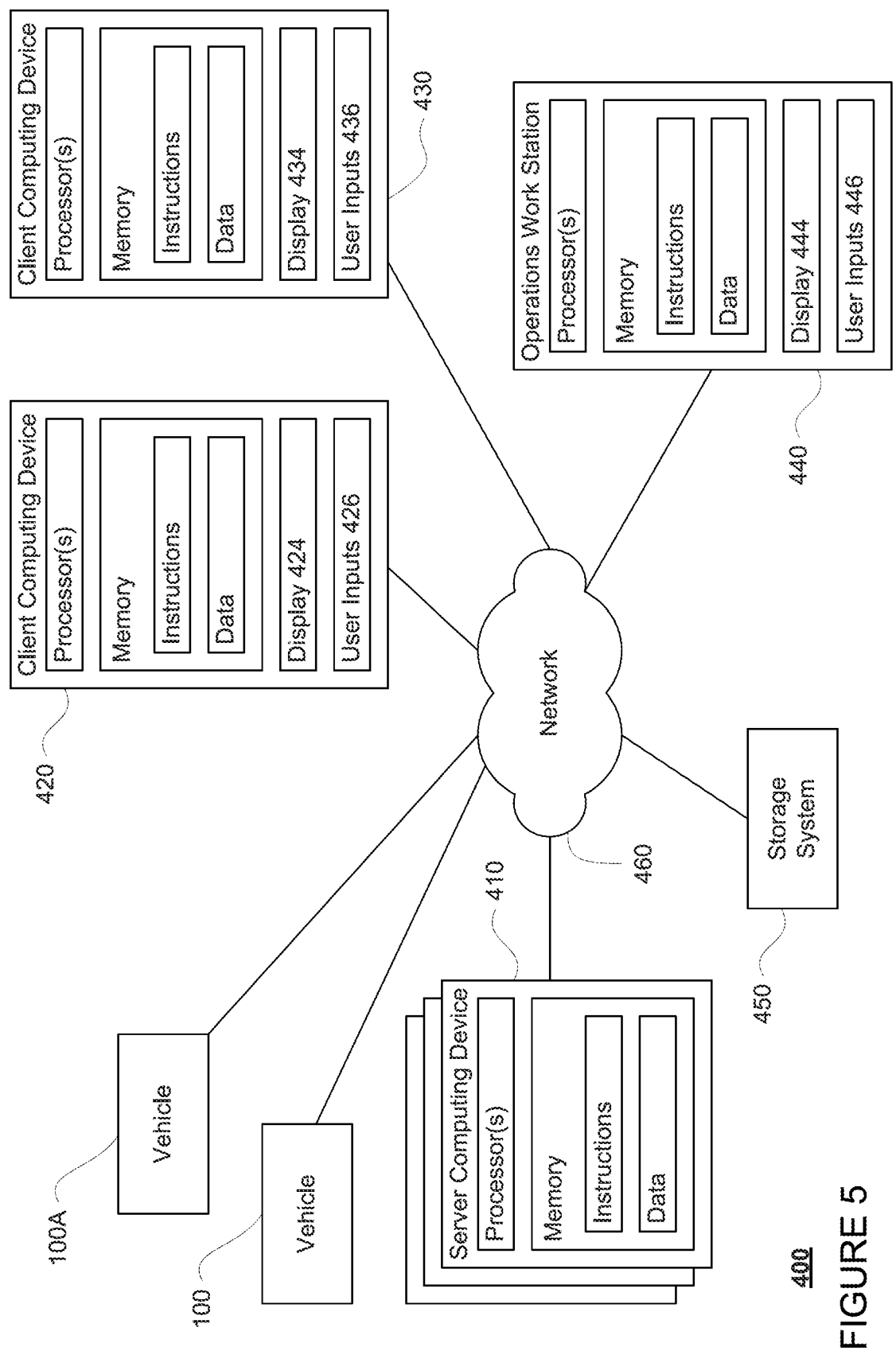
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426,

436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge work station used by an administrator or operator of a depot to provide depot services for the vehicles of the fleet. Although only a concierge work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. In order to provide transportation services to users, the information of storage system 450 may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), one or more unique signals for the user as well as other user preference or settings data.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be defaulted to the current location of the user's client computing device, or can be input by the user at the user's client device. For instance, the user may enter an address or other location information or select a location on a map to select a pickup location. Once the user has selected one or more of a pickup and/or destination locations, the client computing device 420 may send the location or locations to one or more server computing devices of the centralized dispatching system. In response, one or more server computing devices, such as server computing device 410, may select a vehicle, such as vehicle 100, for instance based on availability and proximity to the user. The server computing device 410 may then assign the user as the passenger for the vehicle 100, dispatch the selected vehicle (here vehicle 100) to pick up to the assigned passenger. This may include by providing the vehicle's computing devices 110 with the pickup and/or destination locations specified by the assigned passenger as well as information that can be used by the computing devices 110 of vehicle 100 to authenticate the client computing device, such as client computing device 430.

Figure 6:
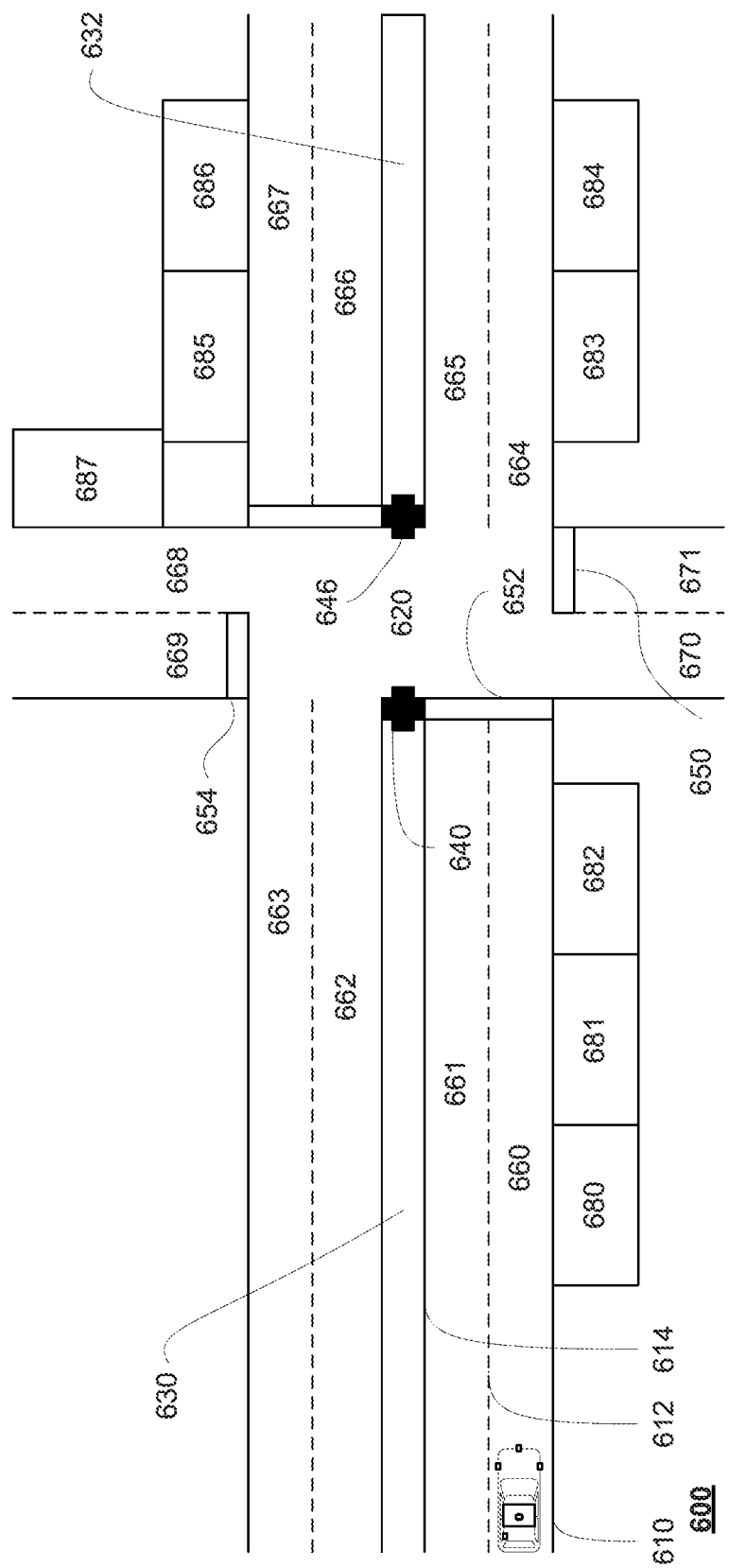
FIG. 6 is an example bird's eye view of a geographic area in accordance with aspects of the disclosure.

Thereafter, the computing devices 110 may maneuver vehicle 100 towards the pickup location and, after picking up the passenger, towards the destination location. FIG. 6 represents a section of roadway 600 corresponding to map information 200. In this regard, lane lines 610, 612, 614, correspond to lane lines 210, 212, 214, intersection 620 corresponds to intersection 220, median areas 630, 632 correspond to median areas 230, 232, traffic signals 640, 640 correspond to traffic signals 240, 242, stop lines 650, 652, 654, 656 correspond to stop lines 250, 252, 254, 256, and lanes 660-671 correspond to lanes 260-271. In addition, parking spaces 680-687 may correspond to parking areas 280-287. Vehicle 100 is depicted as approaching intersection 620 in lane 660.

Figure 7:
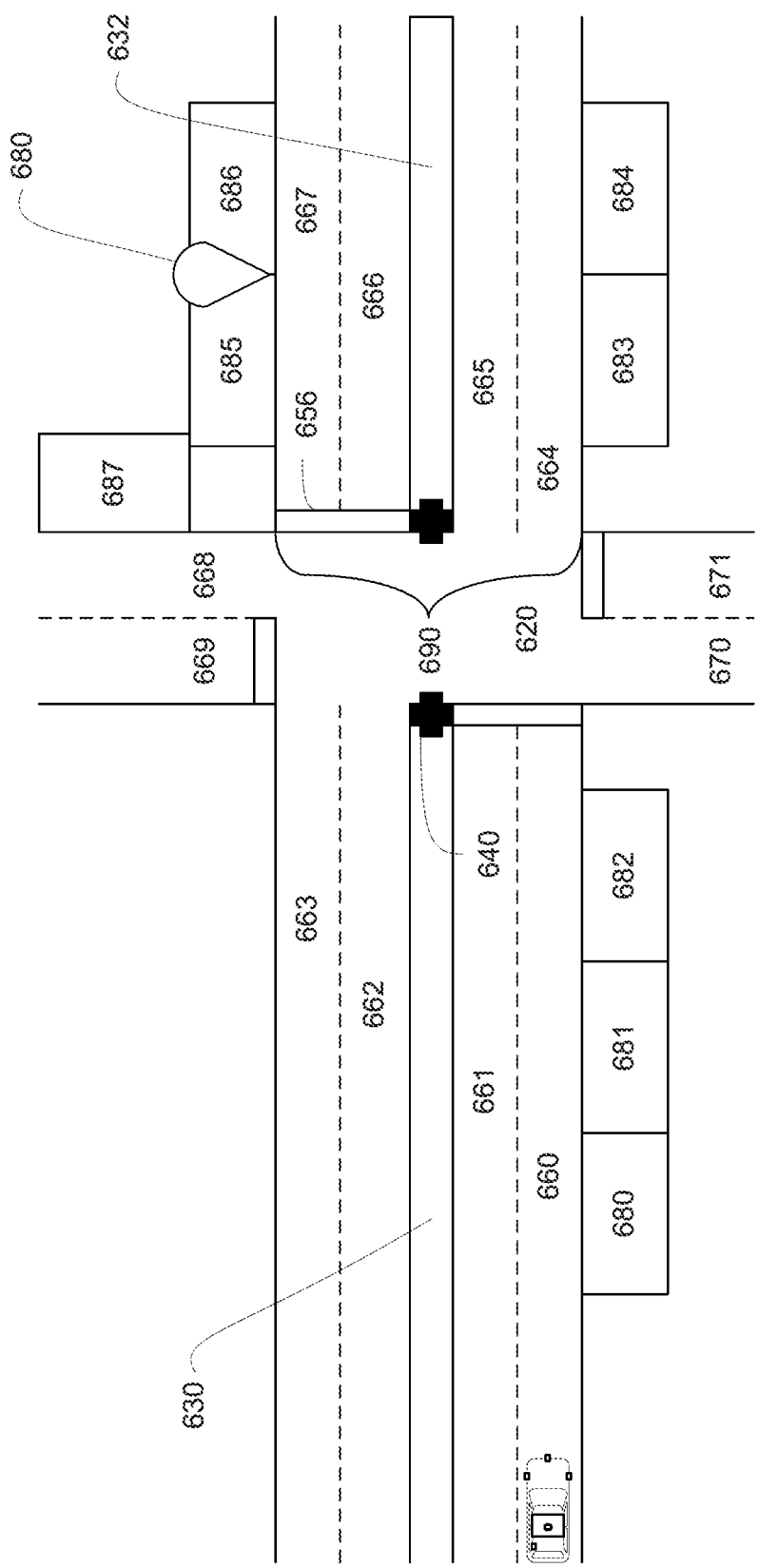
FIG. 7 is an example view of the geographic area of FIG. 6 with data in accordance with aspects of the disclosure.

FIG. 7 corresponds to the area of FIG. 6, but also depicts vehicle 100 in lane 660 and is approaching a location identified by marker 680 corresponding to either a pickup or drop off location for a passenger. This location of marker 680 may be associated with a first side of a street. For instance, lanes 664, 665, 666, and 667 together with median area 632 may define a street 690. In this regard, the area of parking spaces 685 and 686 may define one side of the street 690, and the area of parking spaces 683 and 684 may define another side of the street.

When routing to this location of marker 680, the computing devices 110 may compute costs for routing to the location, selecting a route having the lowest cost. Routing costs may include how long it will take to reach the location, whether the vehicle will need to make any unwanted maneuvers (U-turns, k-turns, unprotected left turns, etc.), how difficult it is to park in the are of the location (based on prior attempts to pick up passengers and other historical data), etc. In the case that the location is a pick up location, the cost may also include how long it will take to reach the destination from the pickup location. In this regard, the computing devices may consider whatever the next location that the vehicle has to reach whether to pick up, drop off, wait for passengers, be serviced, etc., and use that location to determining the cost of routing to the first location. For instance, computing devices may compute a cost for vehicle 100 to reach the location of marker 680. In this example, although vehicle 100 is very close physically to the location of marker 680, actually reaching that location may require vehicle 100 to make several turns or drive around the block. Thus, the cost of reaching the location of marker 680 may actually be quite high.

Figure 8:
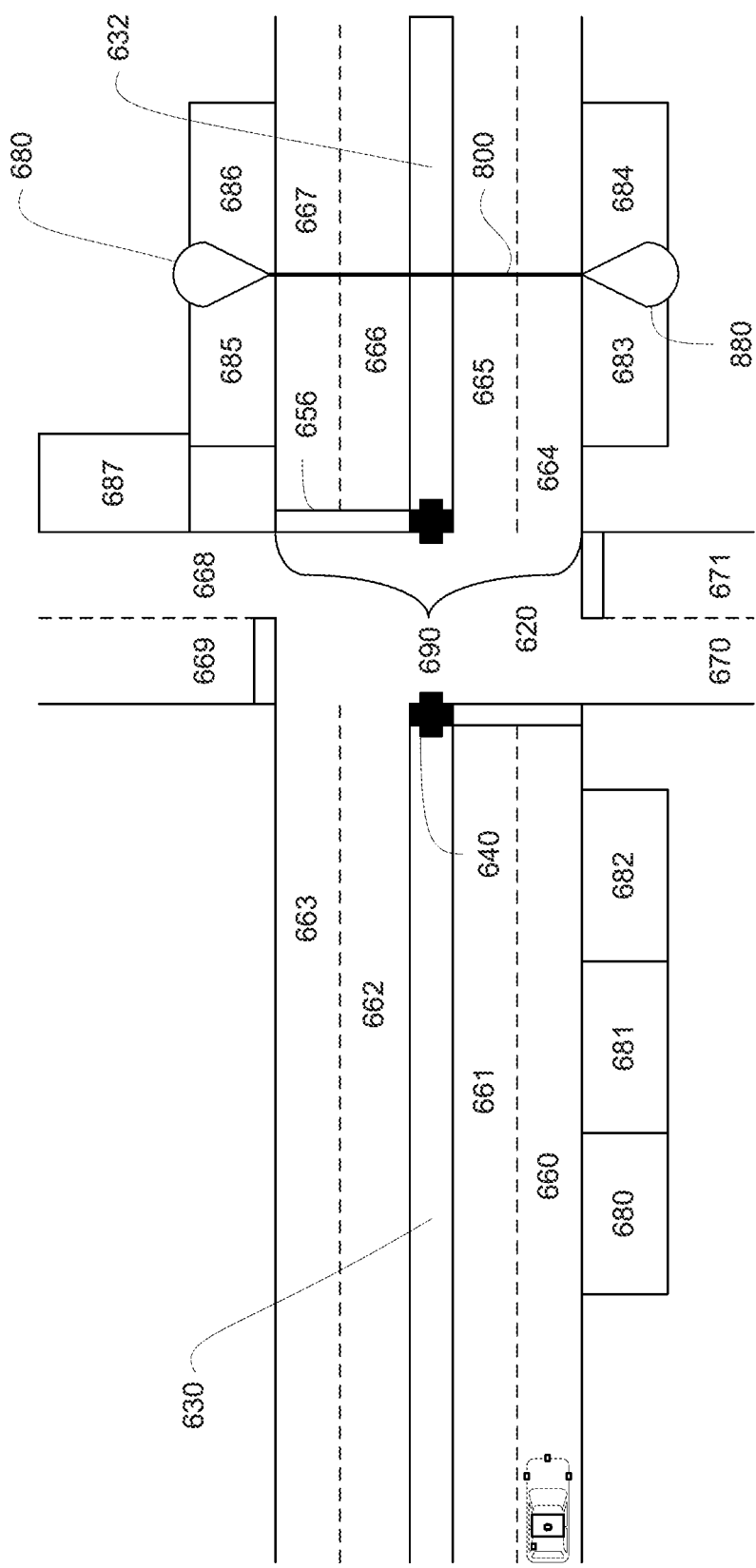
FIG. 8 is an example view of the geographic area of FIG. 6 with data in accordance with aspects of the disclosure.

In addition, the computing devices may identify a second location corresponding to a second side of the street. For instance, the computing devices may draw a perpendicular line across the street 690 from the location of marker 680. The intersection of this line with the second side of the street may be identified as the second location. For instance, FIG. 8 depicts line 800 drawn across street 690. The intersection point with the second side of the street corresponds to the location of marker 880. Alternatively, the closest parking area to the intersection of the line with the second side of the street may be identified as the second location. In this example, the second location may correspond to the area of parking spaces 683 or 684 (or really, parking area 283 or 284).

The computing devices 110 may determine or compute costs for routing to this second location on the side of the street as discussed above. For instance, the cost of routing the vehicle to the location of marker 880 from the vehicle's current location (as shown in FIG. 8) may be determined based on how long it will take to reach the location, whether the vehicle will need to make any unwanted maneuvers (U-turns, k-turns, unprotected left turns, etc.), etc. In this case, the cost of routing the vehicle to the location of marker 880 may be significantly lower than the cost of routing the vehicle to the location of marker 680.

The computing devices may also compute a cost to a passenger for crossing from the first side to the second side. For instance, a cost may be computed based on an assessment of how difficult it would be for a person to cross a street to reach the second location from the first location. This assessment may include looking at the number of lanes and whether there is a median, rules based on the number of lanes, availability of crosswalks, speed limits of the road, the distance the passenger needs to travel to the second location after crossing the street, etc. For instance, because the passenger would have to cross four lanes of traffic, including lanes 667, 666, 665, and 664, as well as median area 632 to reach the location of marker 880 from the location of marker 680, the cost of crossing may be relatively high. However, if there is a crosswalk available to cross street 690 at intersection 620, this may make the cost significantly lower. Similarly, if there is a crosswalk at the intersection 620, the distance between the intersection 620 and each of the locations of marker 680 and 880 may also be considered, or rather how long it would take a passenger to walk to and from the crosswalk at intersection 620. Also, if the speed limit of the street 690 is 35 miles per hour or greater, this may also increase the cost of crossing the street 690. This cost may be combined or added to the cost of routing the vehicle to the second side of the street. For instance, if the cost of routing to the location of marker 880 is "500" and the cost for a passenger to cross street 690 is "1000", a total cost or combined value may be determined by adding these two values. In this regard, the combined cost may be "1500." As another example, the costs may be added in a weighted sum or any other method.

This combined value may be compared to the cost of routing to the location on the first side of the street. If the combined value is less than the cost of routing to the first side or at least a first threshold less, the passenger may be asked if he or she wants to be picked up or dropped off on the second side of the street at the second location. As an arbitrary example, the cost of routing to the location of marker 680 may be "2500." In this example, as "1500" is less than "2500," the computing devices 110 may send a notification to the passenger's client computing device asking the passenger if he or she would like to cross the street for the pickup or drop off. Of course, if the numbers were reversed, the computing devices 110 would not send a notification. As another example, if a first threshold is used, the difference between the combined value and the cost of routing to the first location may be determined. Using the cost of routing to the location of marker 680 of "2500" and the combined cost of "1500," the difference would be "1000." Thus, if the first threshold is "1000" or less, the difference would meet the threshold value, and the computing devices 110 may send the notification to the passenger's client computing device. If the first threshold is greater than "1000," then the difference would not meet the threshold value, and thus the computing devices would not send the notification.

Figure 9:
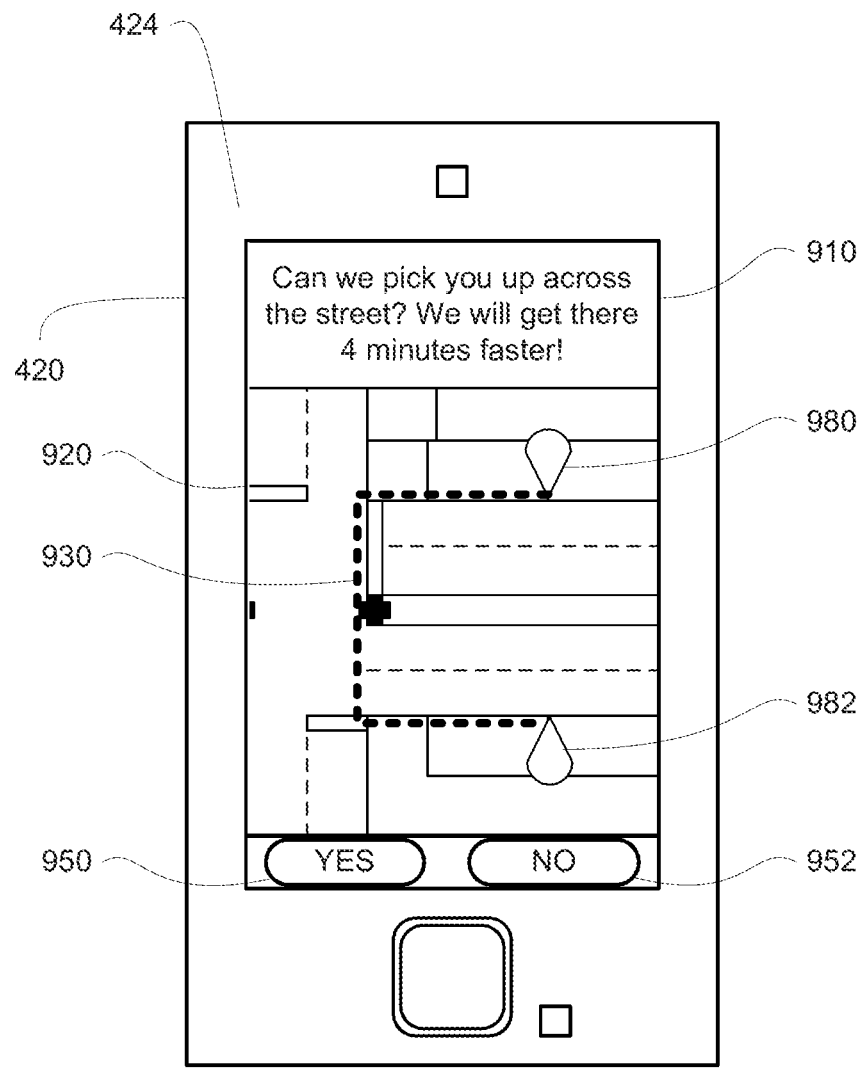
FIG. 9 is an example screenshot and client computing devices in accordance with aspects of the disclosure.

In other words, the comparison between the cost of routing to the location on the first side of the street to the combined cost may be used to determine whether to send a notification to a passenger's client computing device identifying the second location as a possible pickup or drop off location. FIG. 9 depicts an example of a notification 900 displayed on display 424 of client computing device 420 (presumably to user 422). The notification may include a proposal to the passenger that the passenger cross the street to meet the vehicle 100. To assist the passenger in understanding the proposal 910, the notification may also include a map 920 of the area depicting a walking path 930 and or other information which would assist the passenger in reaching the second location from the first location. In other words, the passenger would have to travel from the location of marker 980 (corresponding to the location of marker 680 of FIG. 680) to the location of marker 982 (corresponding to the location of marker 880 in FIG. 8). The notification may also include options 950, 952 which the passenger can use (for instance, tap on with his or her finger) to confirm (accept) or decline the proposal. Of course, in this example, acceptance (for instance, choosing YES option 950) may indicate agreement by the passenger to cross the street 690 while declining (for instance, choosing NO option 952) may indicate that the passenger does not want to cross the street.

In some examples, the notification may even indicate the type of cost savings, such as whether the wait time for the passenger would be significantly shorter, whether the time to the destination would be significantly shorter, and so on. This may encourage the passenger to confirm the change. For instance, the proposal 910 of the notification 900 indicates that the vehicle 100 may reach the location of marker 980 (corresponding to the location of marker 880) 4 minutes faster than the location of marker 982 (corresponding to the location of marker 680). Of course, the presentation and text of the notification may differ depending upon the circumstances.

In addition, the passenger may be provided with an opportunity to cancel an inadvertent acceptance or confirmation of a change to the location. For instance, the notification may include the text, "We will pick you up across the street. It's 4 minutes faster" with an option to have the vehicle head to the this new location. Once the passenger accepts, he or she may subsequently be provided with an option to cancel or undo or confirm, for instance, in the event the passenger made a mistake.

Such notifications may be sent to the passenger's client computing device, either directly from the vehicle's computing devices or indirectly via a dispatching server computing device. If the passenger confirms, for instance by using the YES option 950, a signal may be sent to the computing devices from the client device (either directly or indirectly). This signal may include instructions for the computing devices 110 to control the vehicle 100 to proceed to the second location. In response to receiving such instructions at the vehicle, the computing devices 110 may route the vehicle 100 to the second location, or rather the location of marker 680, in order to pick up or drop off the passenger at that location. If the passenger declines, a corresponding signal indicating that the vehicle should proceed to the first location may be send to the computing devices.

Although the notification 900 corresponds to a pickup of a passenger, similar notifications may be sent in the case of the vehicle dropping of the passenger. In addition or as an alternative to sending the notification to the passenger's client computing device, in the case of a drop off (where the passenger is already in the vehicle 100), the notification 900 may be displayed on an internal display of the vehicle, such as internal electronic display 152. In this example, if the internal electronic display 152, is touch sensitive, the display may also allow the passenger to select a YES or NO option in response to the proposal using his or her finger. This action may send a corresponding signal to the computing devices 110 indicating whether the vehicle should proceed to the first location if declined or reroute to the second location if accepted. Alternatively or in addition, the passenger may respond to the notification by speaking his or her response.

Of course, as noted above, the next location that the vehicle has to reach may also be used to determine the cost of routing to the first location and the cost of routing to the second location. For instance, the cost of routing to the next location from the location of marker 680 may be added to, for instance by using a simple or weighted sum, to the cost of routing to location of marker 680. Similarly, the cost of routing to the next location from the location of marker 880 may be added to, for instance by using a simple or weighted sum, to the cost of routing to the location of marker 880. Thereafter, the cost of the passenger crossing the street may be added to determine the combined cost as discussed above. The combined cost may then be compared to the cost of routing to the first location (which includes the cost of routing to the next location) to determine whether to send a notification. This may allow the costs of future locations to be considered when determining whether to send a notification. Of course, for best comparisons, the cost of routing to the next location should be included in both the costs of routing to the first location and the cost of routing to the second location.

Figure 10:
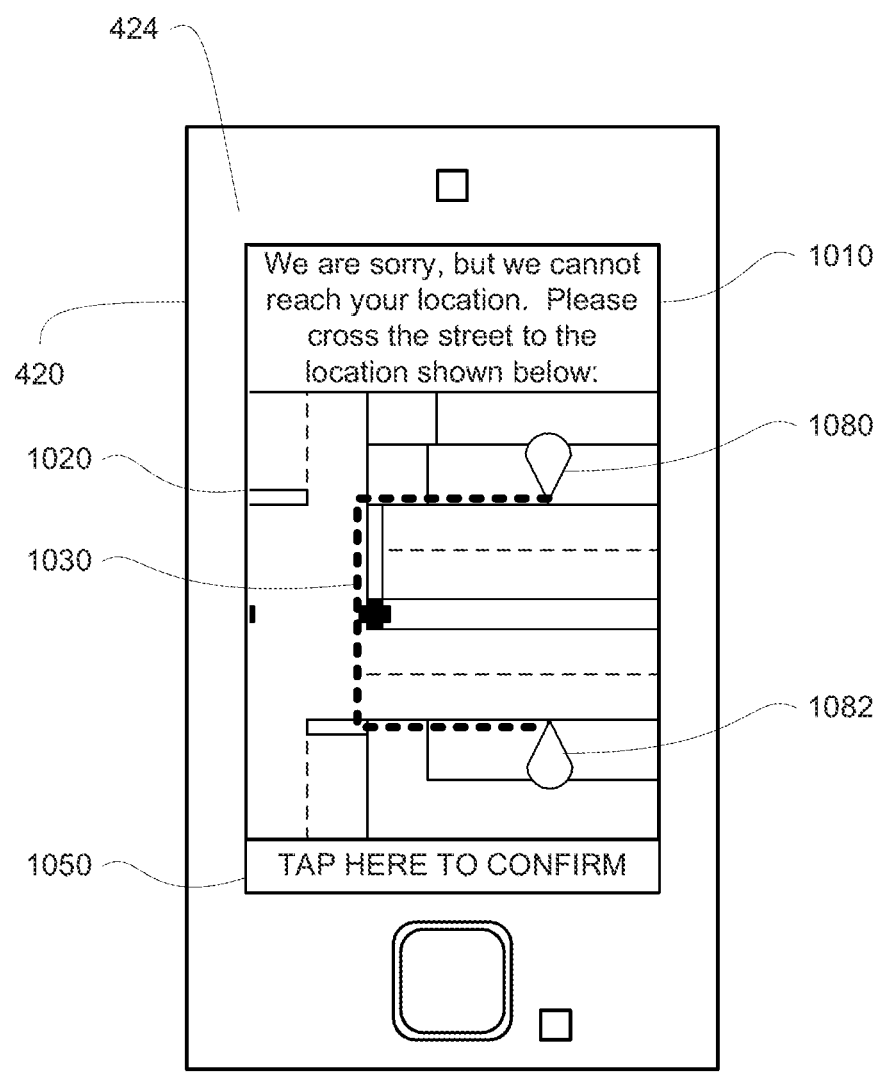
FIG. 10 is an example screenshot and client computing devices in accordance with aspects of the disclosure.

In some instances, it may be necessary to pick up or drop off a passenger at the second location on the second side of the street. For instance, if the location on the first side of the street is unreachable, such as for a temporary traffic redirection or road closure, the cost of routing may be infinitely high. Thus, this may force the computing devices to route to the second location. In this example, rather than asking the passenger if he or she would like to switch, the notification may simply inform the passenger that the switch is necessary and in some cases, why the change is necessary. FIG. 10 provides an example a notification 1000 which includes a message 1010 indicating that the vehicle 100 cannot reach the location of marker 1080 (corresponding to the location of marker 680). Again, the notification also includes a map 1020 with walking directions 1030 to assist the passenger in reaching the new location of marker 1082 (corresponding to the location of marker 880). Of course, the passenger may also be asked to confirm the change, for instance by using option 1050, in order to avoid a situation in which the passenger does not actually know of the change and continues waiting at the first location.

In other examples, changing sides of the street may be less costly, but less desirable. For instance, if the passenger selected a business by name (as opposed to address), and the pick up or drop off location is proximate, for instance within some short distance such as 10 or 20 meters or more or less, to an entrance for the business, changing sides of the street may be very inconvenient. As another example, if the passenger is handicapped or traveling with an elderly passenger or one or more children, has luggage, groceries or other such items, or if the weather conditions are not ideal (for instance, raining, snowing, hailing, very hot, very cold, etc.) the passenger may not be able to safely or conveniently cross the street. In such cases, the first threshold may be increased and/or the costs of reaching the second side of the street or the combined costs may be increased by a certain amount, for instance by adding to or multiplying the amount by the cost of reaching the second side of the street or the combined cost.

These computations and comparison may be repeated periodically to determine if there is a cost savings for the passenger crossing the street. For instance, this calculation may be performed once per second using the vehicle's current location to compute the costs of reaching both sides of the street as well as the cost of crossing from the side of the pickup location to the opposite side of the street.

Of course, before sending a second notification asking the passenger to cross the street, the cost savings must be at least a second threshold significantly greater than the first threshold. For instance, before suggesting that the passenger change the side of the street for the pickup a second time (whether or not the passenger has previously agreed to cross the street to reach the second location), the cost savings for the new location must be at least double or triple the first threshold. For instance, if the first threshold is "1000," then the second threshold may be "2000" or even "3000." This may avoid sending too many notifications to the passenger which can become an annoyance or even confusing.

In some instances, the first or second thresholds may be adjusted based upon the current or changing circumstances. For instance, if it is raining, a passenger may prefer to be picked up sooner, or rather whichever side of the street would reduce the waiting time, even if the cost to reach the destination increases. In this example, the passenger may prefer to be in the vehicle longer.

Although the examples above relate to crossing the street, rather than calculating the cost savings between two locations on opposite sides of the same street, the computing devices may calculate the cost savings for different locations on different streets. For instance, the computing devices may identify a second location "around the corner" or "one block over" and if the cost savings are great enough, e.g. meet the first threshold, provide a notification to the passenger asking if they would prefer to be picked up at this second location. Preferably, this second location is within a short distance from the first location, such as 1 minute walking distance or more or less, and may be determined, for instance, by sampling points on nearby lanes, computing routes to each sampled point, and compare the route with the best cost with the current route to determine whether a notification should be generated. When computing the costs, rather than computing a cost to cross the street, the computing devices may compute a cost to reach the second location. As with the examples, above, the cost savings may be recomputed periodically, and if a second, higher threshold is met, a notification can be sent to the passenger.

Figure 11:
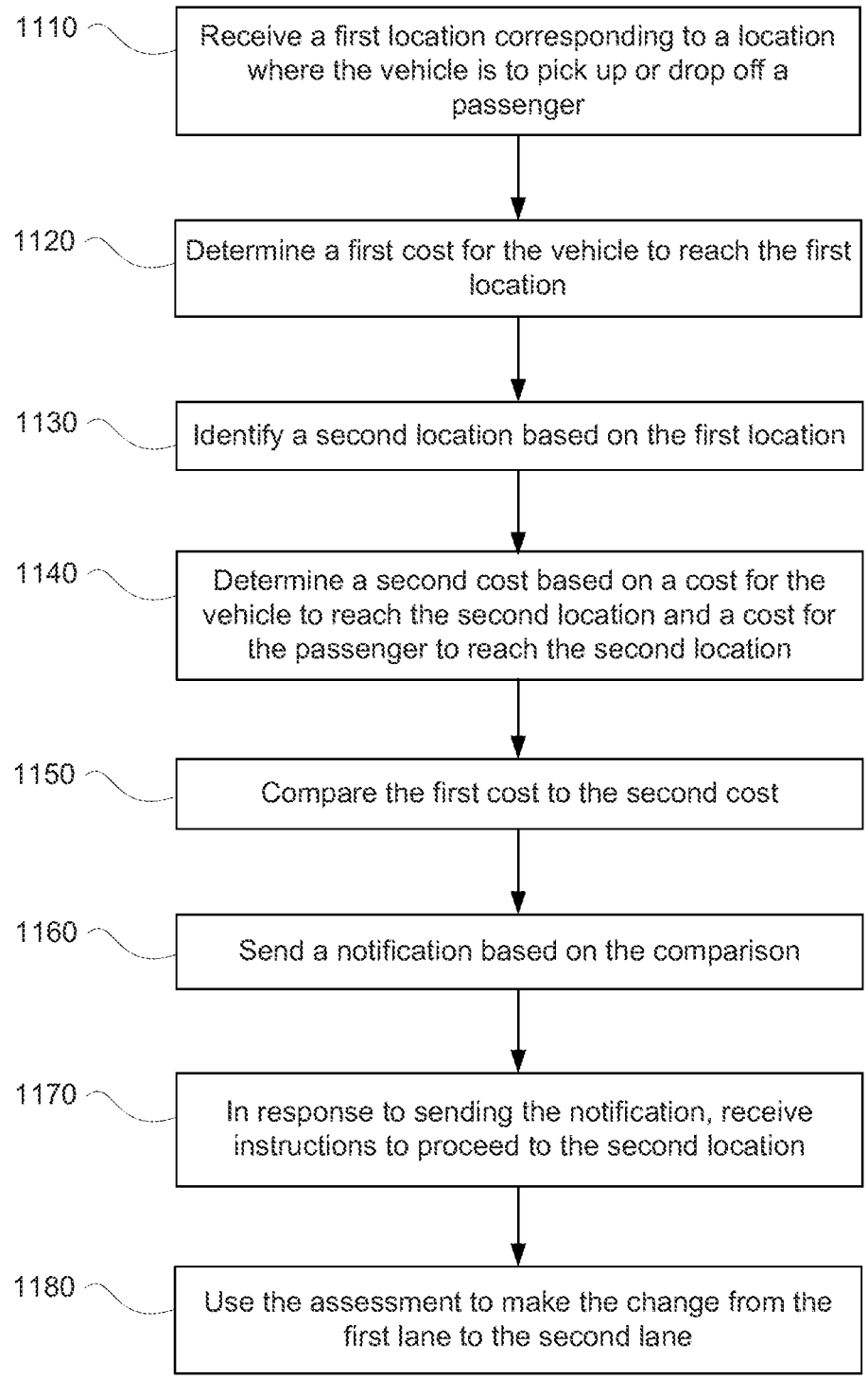
FIG. 11 is an example flow diagram in accordance with aspects of the disclosure.

FIG. 11 includes an example flow diagram 1100 of some of the examples for controlling a vehicle, such as vehicle 100, in an autonomous driving mode which may be performed by one or more processors of one or more computing devices, such as processors 120 of one or more computing devices 110. In this example, a first location corresponding to a location where the vehicle is to pick up or drop off a passenger is received at block 1110. A first cost for the vehicle to reach the first location is determined at block 1120. A second location is identified based on the first location at block 1130. A second cost is determined based on a cost for the vehicle to reach the second location and a cost for the passenger to reach the second location at block 1140. The first cost is compared to the second cost at block 1150. A notification is sent based on the comparison at block 1160. In response to sending the notification, instructions to proceed to the second location are received at block 1170. In response to receiving the instructions, the vehicle is controlled in the autonomous driving mode to the second location to pick up or drop off the passenger at block 1180.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in an autonomous driving mode, the method comprising:
receiving, by one or more processors of the vehicle, a first location corresponding to a location where the vehicle is to pick up or drop off a passenger;
controlling, by the one or more processors, the vehicle in the autonomous driving mode towards the first location;
while controlling the vehicle in the autonomous driving mode in order to reach the first location:
determining, by the one or more processors, a first cost for the vehicle to reach the first location,
identifying a second location based on the first location, and
determining, by the one or more processors, a second cost based on a cost for the vehicle to reach the second location and a cost for the passenger to reach the second location, and
based on a comparison of the first cost to the second cost, controlling, by the one or more processors, the vehicle in the autonomous driving mode to pick up or drop off the passenger.

2. The method of claim 1, wherein the first location corresponds to a first side of a street, and wherein identifying the second location includes selecting the second location on a second side of the street opposite of the first side of the street.

3. The method of claim 2, wherein determining the cost for the passenger to reach the second side includes determining the cost for the passenger to reach the second side.

4. The method of claim 3, wherein determining the cost of the passenger to reach the second side includes assessing an amount of difficulty for the passenger to cross the street.

5. The method of claim 4, wherein assessing the amount of difficulty is based on whether there is a median on the street.

6. The method of claim 4, wherein assessing the amount of difficulty is based on a number of lanes to be crossed.

7. The method of claim 4, wherein assessing the amount of difficulty is based on an availability of crosswalks for the passenger to use to cross the street.

8. The method of claim 4, wherein assessing the amount of difficulty is based on a speed limit for the street.

9. The method of claim 4, wherein assessing the amount of difficulty is based on whether there is a crosswalk.

10. The method of claim 3, wherein determining the cost of the passenger to reach the second side includes determining a distance the passenger needs to travel to the second location after crossing the street.

11. The method of claim 1, wherein determining the second cost includes adding the cost for the vehicle to reach the second location and the cost for the passenger to reach the second location.

12. The method of claim 1, wherein the comparing includes determining a difference between the first cost and the second cost and comparing this difference to a first threshold value.

13. The method of claim 12, further comprising, determining the first threshold value based on circumstances for the pick up or drop off.

14. The method of claim 1, further comprising:
as the vehicle is being controlled towards the second location, determining a third cost for the vehicle to reach the second location using a current location of the vehicle;
determining a fourth cost based on a cost for the vehicle to reach a third location using the current location of the vehicle and a cost for the passenger to reach the third location from the second location; and
based on a comparison of the third cost to the fourth cost, controlling the vehicle in the autonomous driving mode to pick up or drop off the passenger.

15. The method of claim 14, wherein determining the cost for the passenger to reach the third location includes determining the cost for the passenger to reach the first side.

16. The method of claim 14, wherein the comparing includes determining a difference between the first cost and the second cost and comparing this difference to a second threshold value, and wherein the second threshold value is greater than the first threshold value.

17. The method of claim 16, further comprising sending a notification indicating that the vehicle will pick up the passenger at the second location when the difference meets the second threshold value.

18. The method of claim 1, further comprising periodically updating the first cost and the second cost, and wherein the comparing includes using the updated first cost and second cost.

19. The method of claim 1, further comprising, based on the comparison of the first cost to the second cost, sending a notification indicating that the vehicle will pick up the passenger at the second location.

20. The method of claim 19, wherein the notification requests that the passenger confirm the pickup at the second location.

21. The method of claim 19, wherein the notification further indicates a reason why the vehicle will pick up the passenger at the second location.

22. The method of claim 19, wherein the notification further includes walking directions to the second location.

23. The method of claim 1, wherein the second location is on a different block from the first location.

24. The method of claim 1, wherein the second location is on an opposite side of a street from the first location.

25. The method of claim 1, wherein the second location is around a corner from the first location.

\* \* \* \* \*